E. W. YEARSLEY.
VALVE.
APPLICATION FILED JULY 9, 1917.
1,409,270.
Patented Mar. 14, 1922.
2 SHEETS—SHEET 1.
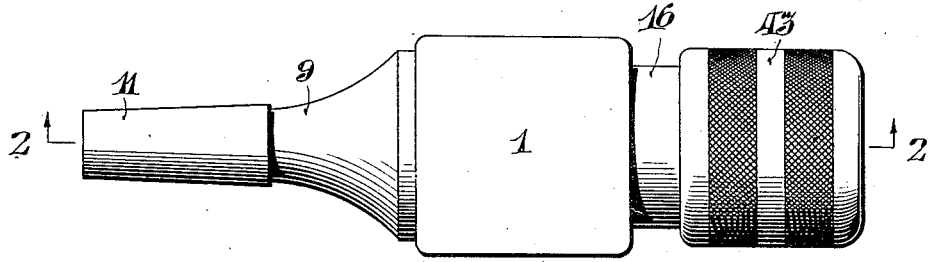
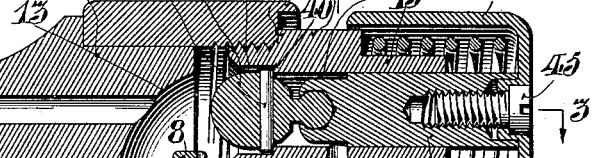
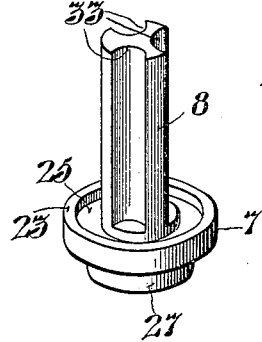
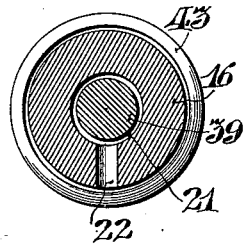
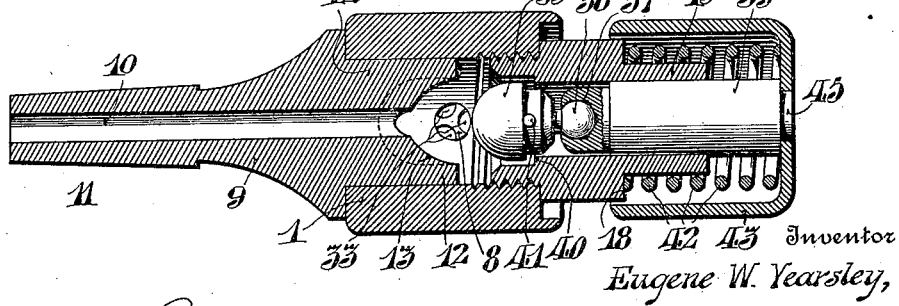
Inventor
Eugene W. Yearsley,
By Clifton C. Hallowell
Attorney
Witness
William J. Russell

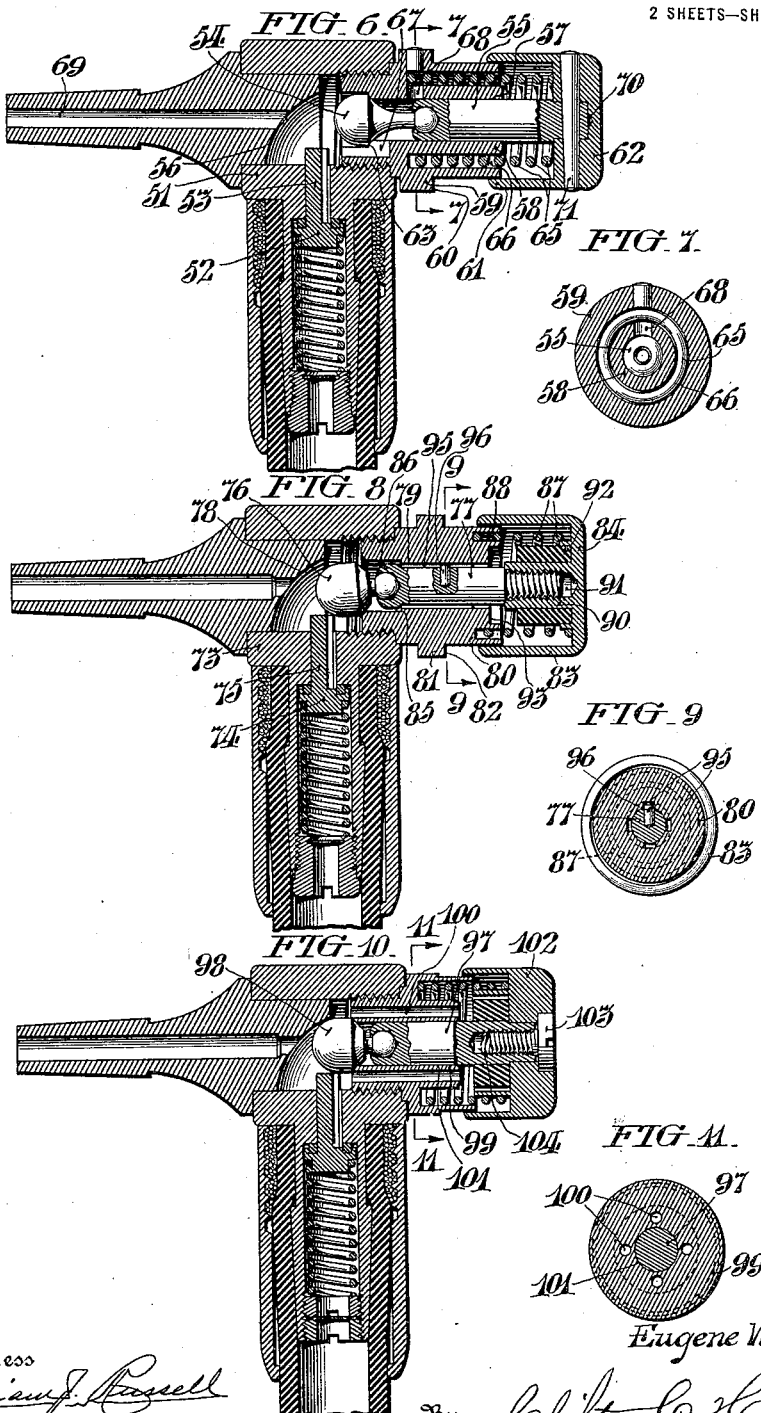

UNITED STATES PATENT OFFICE.

EUGENE W. YEARSLEY, OF BROOKLYN, NEW YORK, ASSIGNOR TO THE S. S. WHITE DENTAL MANUFACTURING COMPANY, A CORPORATION OF PENNSYLVANIA.

VALVE.

1,409,270.    Specification of Letters Patent.    Patented Mar. 14, 1922.

Application filed July 9, 1917. Serial No. 179,360.

*To all whom it may concern:*

Be it known that I, EUGENE W. YEARSLEY, a citizen of the United States, and a resident of Brooklyn, in the county of Kings, State of New York, United States of America, have invented certain new and useful Improvements in Valves, of which the following is a specification, reference being had to the accompanying drawings.

My invention relates particularly to that class of valves commonly known as cut-off valves, and adapted to control the air supply in connection with spray-bottles or atomizers and is especially directed to the release of the air pressure therein.

The principal objects of my invention are to provide a valve of the class described which is not only simple and efficient but durable in its construction, and which quickly responds to the action of the operator both in opening and in closing.

My invention further comprehends such a novel arrangement of the valve actuating mechanism as will permit the substantially instantaneous relief of the pressure in the atomizer, contemporaneously with the cutting off of the flow of compressed air or other fluid.

Specifically stated, the form of my invention as hereinafter described comprises a valve having a stem, which is arranged to be opened by the movement in a relatively transverse direction, of a plunger carrying a universally swiveled, substantial hemispherical member arranged to rock upon said stem and exert pressure thereon in the direction of the axis of said stem to open said valve.

My invention also includes all of the various novel features of construction and arrangement of the parts as hereinafter more definitely specified.

In the accompanying drawings, Fig. 1 is a plan view of a valve structure constructed in accordance with my invention; Fig. 2 is a longitudinal sectional view of said valve structure taken in the direction of the arrows on line 2—2 in Fig. 1; Fig. 3 is a plan sectional view of the valve structure taken on the line 3—3 in Fig. 2; Fig. 4 is a perspective view of the valve per se; Fig. 5 is a transverse sectional view of said valve structure taken on the line 5—5 in Fig. 2; Fig. 6 is a longitudinal sectional view of a modified form of the valve structure shown in Figs. 1 to 5 inclusive; Fig. 7 is a transverse sectional view of the valve structure shown in Fig. 6 taken on the line 7—7 in said figure; Fig. 8 is a longitudinal sectional view of another form of valve structure constructed in accordance with my invention; Fig. 9 is a transverse sectional view of the valve structure shown in Fig. 8 taken on the line 9—9 in said figure. Fig. 10 is a longitudinal sectional view of a further modification of a valve structure constructed in accordance with my invention; and Fig. 11 is a transverse sectional view of the valve structure shown in Fig. 10 taken on the line 11—11 in said figure.

In the form of my invention shown in Figs. 1 to 5 inclusive, the valve casing comprises a hollow body 1 having a laterally extended nipple 2 which provides a convenient inlet passageway 3 communicating through a restricted aperture 5 with the hollow of the body 1 and affording a seat 6 for the valve 7 whose stem 8 extends through said aperture 5 and projects into and terminates within the chamber in said hollow body.

The body 1 is provided with a forwardly extending nozzle 9, having an outlet passageway 10 and provided with a tapered nipple 11 for convenient attachment with a spray bottle, atomizer or other suitable device. Said nozzle 9 is rigidly connected to the body 1 by the inwardly projecting hub 12, extending into the hollow of said body, and provided with an eccentric concave recess having a surface 13 curving toward the nipple 2.

Said body 1 is also provided with the rearwardly extended sleeve 15 in threaded engagement therewith, having an intermediate flange 16 forming oppositely directed shoulders 17 and 18, the former of which abutting against the rear surface 19 of the body 1, which surface is slightly depressed and is surrounded by the flange 20 as shown in Figs. 2 and 3.

The sleeve 15 is provided with the axially disposed bore 21 extending therethrough and having a laterally directed exhaust port 22 extending through the flange 16 and communicating with the atmosphere, to relieve the pressure within the chamber in the body 1 when the valve 7 is closed.

The valve 7 is provided with a flange 23 forming an annular groove 25 to receive the washer 26 of leather, rubber, or other suitable material and affording a shoulder 27 for engagement of the spring 29 which tends to force the valve 7 into engagement with its seat 6. Said spring 29 is disposed within the inlet passageway 3 and is held under compression therein by the tubular screw-plug 30 having a bore 31 provided with the foraminous diaphragm 32, serving as a strainer for the air or other fluid which may be caused to flow through the passageway 3 when the valve 7 is opened.

As best shown in Figs. 3 and 4, the stem 8 of the valve 7 is cylindriform so as to snugly fit the restricted cylindrical aperture 5 in which it is arranged to reciprocate and is provided with longitudinal flutes 33 which afford free passage for the air or other fluid when the valve is forced from its seat in opposition to the spring 29.

As shown in Fig. 2 the free end of the valve-stem 8 projects into the concave recess in the hollow body, so as to be engaged by the valve opening plunger-knob 35 having the hemispherical forward surface, and which is connected for universal movement by the ball 36 and socket 37 connection, with the plunger 39 which is snugly fitted for axial movement in the bore 21 of the sleeve 15.

The forward end of the bore 21 is counter-sunk at 38 to afford a shoulder 40 serving as a stop for the plunger 39 by cooperation of the transversely extended pin 41 in the knob 35 with said shoulder, which pin projects laterally therefrom, and is normally held against the shoulder 40 by the spiral spring 42 which encircles the plunger 39 and is enclosed within a cup-shaped shell 43, and has its opposite ends respectively bearing against the shoulder 18 and the inner surface of the shell 43.

The shell 43 is carried by the plunger 39 being secured thereto by the screw 45 and serves as a thumb-push by which said plunger and its loosely mounted knob 35 may be forced inwardly to open the valve 7, said knob being deflected laterally against the free end of the valve-stem 8, by its sliding contact with the concave surface 13 which serves as a cam tending to cause the knob 35 to rock upon the end of said valve-stem 8, and at the same time exerting sufficient pressure thereon in the direction of its axis to force the valve 7 from its seat in opposition to the spring 29.

As best shown in Fig. 2, the nipple 2 may be connected with any suitable source of compressed air or other fluid supply by the pipe or tube 46 which may be engaged in sealed relation with said nipple 2 by the washer or collar 47, and internally thread ferrule 49 which conveniently serves as a handle by which the valve structure may be held by the operator.

The plunger 39 is so constructed and arranged as to serve as a controlling valve for the exhaust port 22 which as best shown in Figs. 2 and 3, is in free communication with the hollow of the valve body 1 and its passageway, through the bore 21 when said plunger is in its normal position as shown in said figures, but which will be closed by said plunger when shifted inwardly by the operator in effecting the opening of the valve 7.

It will thus be readily observed that all of the compressed air flowing through the valve 7 will be directed through the passageway 10 so long as said valve is held open by the knob 35 and the plunger 39 but contemporaneously with the closing of the valve 7, upon the release of the plunger 39, the port 22 is opened to permit the exhaust of any residual air pressure in the hollow of the body 1 or devices which may be connected therewith.

It may be here noted that when the plunger 39 is forced inwardly to open the valve 7, the forward edge of the cup-shaped shell 43 may be caused to tightly engage the surface 19 of the body 1, thereby sealing said shell and preventing any leakage between the wall of the bore 21 and plunger 39.

My invention is advantageous in that the relatively transverse movement of the plunger 39 and the valve-stem 8 does not tend to cause said valve-stem to bind in the aperture 5 in which it slides, for the reason that the knob 35 being connected with the plunger 39 by a ball and socket joint, is caused to rock upon the end of the valve-stem 8 when deflected from axial alignment with said plunger, by engagement with the concave cam surface 13.

My invention is further advantageous in that the residual pressure is released contemporaneously with the closing of the valve, and consequently the spray from the spray-bottle or atomizer will be cut off simultaneously therewith, being under absolute control of the operator.

In the form of my invention shown in Figs. 6 and 7, the valve body 51 is similar to the valve body 1, and embodies the valve 52 having a stem 53, arranged to be opened by the knob 54 which is universally connected with the plunger 55 and arranged to be shifted inwardly thereby and deflected by the cam surface 56 to open said valve 52.

Said plunger 55 is arranged to reciprocate within the bore 57 of the sleeve 58 which has the flange 59 providing a shoulder 60, against which the forward end of the flange 61 of the thumb-push 62 may be sealed when it is thrust forwardly by the operator to open the valve 52.

The forward end of the bore 57 is countersunk to provide a shoulder 63 serving as a stop for the plunger 55, against which stop the knob 54 is normally held by the spiral spring 65 which is disposed in the annular groove 66 provided therefor in the sleeve 58, said spring having its opposite ends respectively bearing against the forward end of said groove and the inner surface of the thumb-push 62.

The bore 57 is provided with an offset recess 67 providing a passageway forming a communication between the hollow of said valve body 51 and said bore, exterior of shoulder 63, and said bore is also provided with a port forming a communication with the forward end of the groove 66 which opens into the thumb-push 62 whose forwardly extended flange 61 encircles the rear end of the sleeve 58, but which is loosely fitted thereto, to permit the escape of the exhaust from the valve body when the valve 52 is closed.

It will be readily seen that the forward movement of the plunger 55 serves to close the port 68 so that as compressed air or other fluid is permitted to pass through the valve body 51, upon the opening of the valve 52, the passageway through the port 68 into the groove 66 will be closed, and said air or other fluid will be caused to flow through the outlet 69, but upon the release of the thumb-push 62 and the consequent closing of the valve 52, any residual air pressure in the valve body 51 will be permitted to exhaust through the passageway 67, bore 57, port 68, groove 66 to the interior of the thumb-push 62 from where it may escape between the flange 61 and sleeve 58.

In this form of my invention, the thumb-push 62 is provided with a socket 70 into which the rear end of the plunger 55 extends; said plunger having a suitable tapered aperture therein, arranged to register with a corresponding tapered aperture in said thumb-push 62 through which the cotter pin 71 may be inserted transversely as shown in Fig. 6, to rigidly engage the thumb-push with the plunger.

In the form of my invention shown in Figs. 8 and 9 the valve body 73 embodies the valve 74 having a stem 75 projecting in the hollow of the valve body 73, and being arranged to be opened by the knob 76 which is universally connected with the plunger 77, and arranged to be shifted inwardly thereby and deflected by the cam surface 78 to open said valve 74.

The plunger 77 is arranged to reciprocate within the bore 79 of the sleeve 80 which has the flange 81 providing a shoulder 82 against which the forward end of the forwardly extending flange 83 of the thumb-push 84 may be engaged when said thumb-push is thrust forwardly by the operator to open the valve 74.

The forward end of the bore 79 is countersunk to provide a shoulder 85 serving as a stop for the plunger 77 which has the enlarged forward portion 86, arranged to be normally held in engagement with said shoulder 85, by the spiral spring 87 which has its respectively opposite ends engaged in the groove 88 in said sleeve 80 and with the inner surface of the thumb-push 84. Said thumb-push 84 is provided interiorally with the hub 90 having the threaded socket 91 arranged to receive the threaded rear end of the plunger 77.

Said hub 90 is surrounded by the annular washer 92 of rubber, leather or other suitable material, arranged to bear against the rear depressed surface 93 of the sleeve 80, so as to seal the bore 79 which is provided with longitudinally extending grooves 95 forming passageways arranged to relieve the residual pressure within the valve chamber when the thumb-push is released by the operator to close the valve 74. Such residual pressure escapes through the grooves 95 into the shell forming the thumb-push 84, escaping therefrom between the flange 83 and the outer surface of the sleeve 80.

It may be desirable to prevent rotation of the plunger 77 and the parts carried thereby, within the sleeve 80, for which purpose said plunger is provided with a pin 96 projecting radially therefrom into one of the grooves 95 in said sleeve.

In the form of my invention shown in Figs. 10 and 11, the plunger 97 is provided with a universally mounted knob 98, and is arranged to reciprocate in the sleeve 99 which is provided with longitudinally extending passageways 100 independent of the bore 101, affording exhaust vents through which the residual air pressure in the valve-body may escape.

In this form of my invention, the thumb-push 102 is secured to the plunger 97, by the screw 103 which may be extended through a suitable aperture in the thumb-push 102, and engaged with the threaded socket 104, in the end of said plunger.

The valve structures shown in Figs. 6 to 11 inclusive are generally similar in construction to the valve structure shown in Figs. 1 to 5 inclusive except for the specific means for venting the chamber in the hollow valve-body and the specific means for attaching the thumb-push to the respective plungers.

I do not desire to limit my invention to the precise details of construction and arrangement as herein set forth, as it is obvious that various modifications may be made therein without departing from the essential features of my invention as defined in the appended claims.

Having thus described my invention, I claim:—

1. A device of the class described, comprising a hollow casing having a passageway, a valve normally closing said passageway, and a manually actuated valve opener movable in a direction transverse to the movement of said valve and having a swiveled member movable laterally by cooperation with the casing wall to effect the actuation of said valve.

2. A device of the class described, comprising a hollow casing having a passageway, a valve normally closing said passageway, and a manually actuated plunger having a swiveled member arranged to be deflected from its axial movement by cooperation with the casing wall to effect the actuation of said valve.

3. A device of the class described, comprising a hollow casing having an inlet and outlet, a valve normally closing said inlet, a manually actuated plunger movable in a direction transverse to the movement of said valve, and a swiveled member having a spheroidal surface, arranged to be thrust inwardly by said plunger to effect the opening of said valve.

4. A device of the class described, comprising a casing having a passageway therethrough and provided with a cam surface therein, a valve controlling said passageway, a plunger movable transversely to the movement of said valve, and a loosely disposed member thrust inwardly by said plunger and cooperative with said cam surface to actuate said valve.

5. A device of the class described, comprising a casing having a passageway therethrough and provided with a cam surface, a valve controlling said passageway, a plunger movable transversely to the movement of said valve, and a loosely mounted member having a ball and socket connection with said plunger, movable thereby into cooperative engagement with said cam surface to actuate said valve.

6. A device of the class described, comprising a valve casing having an inclined surface, a controlling valve, and a plunger carrying a loosely mounted knob, arranged to cooperate with said surface and valve, when forced inwardly to actuate said valve.

7. A device of the class described, comprising a casing having a chamber provided with an inclined surface and having an exhaust vent leading to the atmosphere, a controlling valve, and means cooperative with said inclined surface to effect the opening and closing of said valve, and to close said vent upon the opening of the valve, and to open said vent upon the closing of said valve.

8. A device of the class described, comprising a valve casing having an inclined surface within its chamber, a controlling valve having a stem extending into said chamber and means arranged to rock upon said stem by cooperating with said inclined surface to effect the opening and closing of said valve.

9. A device of the class described, comprising a valve casing having an inclined surface within its chamber, and having an exhaust vent leading to the atmosphere, a controlling valve having a stem extending into said chamber, and means arranged to rock upon said stem by cooperating with said inclined surface to effect the opening and closing of said valve and to contemporaneously effect the closing and opening of said vent.

10. A device of the class described, comprising a valve casing having a passageway therethrough and a communicating bore having an exhaust vent, a valve controlling said passageway, a plunger controlling said vent, and a knob swiveled to said plunger for relatively deflective movement, cooperating with the wall of said chamber, and being deflected thereby to open said valve when said plunger is actuated to close said vent, and to close said valve when said plunger is released to open said vent.

In witness whereof, I have hereunto set my hand this 27th day of June, A. D., 1917.

EUGENE W. YEARSLEY.

Witnesses:
SAMUEL R. BARTON,
THOMAS W. HOLLEWELL.